Sept. 22, 1931.   P. DONOHOE   1,824,199
INDENTIFICATION SEAL
Filed April 27, 1931
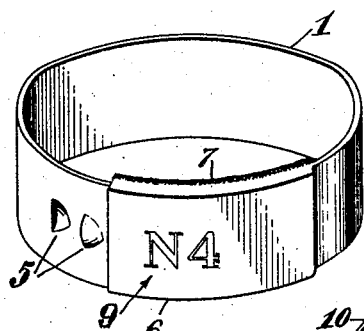
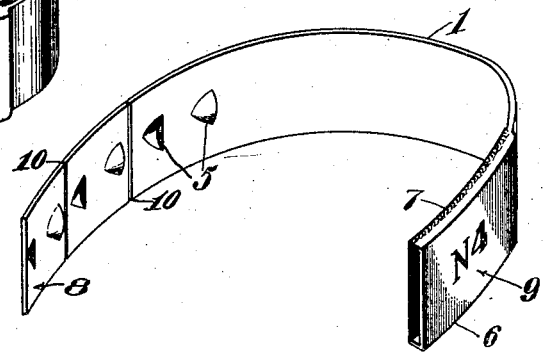
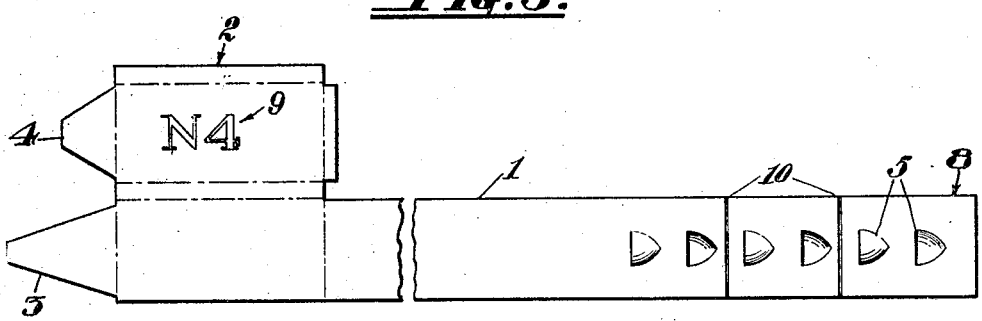
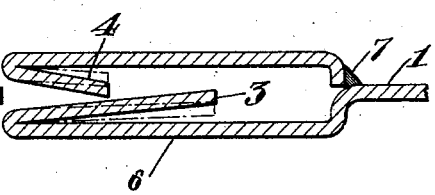
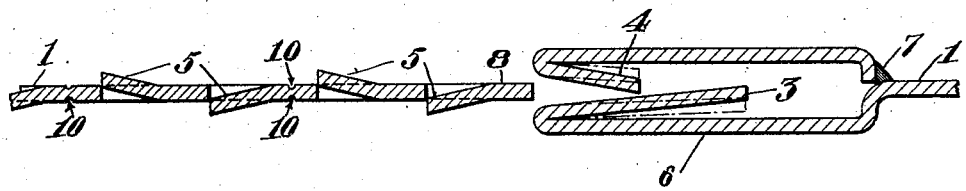
Inventor
Philip Donohoe.

Patented Sept. 22, 1931

1,824,199

UNITED STATES PATENT OFFICE

PHILIP DONOHOE, OF LOS ANGELES, CALIFORNIA

IDENTIFICATION SEAL

Application filed April 27, 1931. Serial No. 533,231.

This invention relates to strap or loop seals which after affixation must be broken to be removed, and more particularly has to do with seals of this type which are especially designed to prevent substitution of merchandise identified thereby.

An object of the invention is to provide an identification seal which is constructed and arranged so that when affixed to merchandise such as trees, shrubs, plants, articles of furniture and the like, when selected by the purchaser thereof, it cannot be removed without being broken and therefore serves as a lasting and positive means of identification, preventing substitution of the selected goods.

Another object is to provide a seal of the character described which may be cheaply made of a single strip of strap or sheet metal formed and arranged to provide a reliable means for permanently locking the seal coincident with the affixation thereof.

A further object is to provide a lock seal of the character described which is characterized by an efficient lock arrangement providing for a tight fitting of the seal around an object to which it is applied while maintaining the seal securely locked thereon.

Yet another object is to provide a seal such as described which is adjustable to fit tight around and remain securely in place upon objects of various sizes, by reason of novel adjustments permitted in locking the seal in place.

With the foregoing objects in view together with such other objects and advantages as may subsequently appear, the invention resides in the parts and in the combination, construction and arrangement of parts hereinafter described and claimed and illustrated by way of example in the accompanying drawings in which:

Figure 1 is a perspective view of the seal of this invention as it would appear when in use;

Figure 2 is a perspective view of the seal as when open;

Figure 3 is a top plan view of the blank of which the seal is formed;

Figure 4 is an enlarged sectional view of the female element of the locking means of the seal;

Figure 5 is a sectional view of the male element of said locking means.

The one form of seal here shown in detail, as illustrative of this invention, comprises a band or strip 1 of suitable sheet or strap metal arranged to be looped or banded around an object to be identified. Although a metal band is preferable, bands of various other materials may be used inasmuch as regardless of the material used the band is so affixed that it cannot be removed without detection, it being necessary to break, cut or rupture the band to remove it.

To provide for locking the seal in place the ends of the band 1 are arranged to be permanently interlocked in overlapping and telescopic relation to one another. One of said ends is formed with an enlargment 2 having spaced resilient locking tongues 3 and 4 formed integral therewith, as shown in Figure 3, whereas the other end 8 is provided with a series of spaced locking teeth 5 struck out from opposite sides thereof, as paricularly shown in Figure 5.

The enlarged end 2 is bent to form a rectangular housing or socket 6, as shown in Figures 3 and 4, after the tongues 3 and 4 are bent to extend in opposed relation and convergently into said socket when formed, as particularly shown in Figure 4. As one tongue is longer than the other it may be seen that said tongues have their free ends disposed at spaced points within the socket. The end 2 is folded or bent so that the both ends and one longitudinal side or edge of the socket 6 are left open. To form a protective enclosure, however, said longitudinal side or edge and the inner end of the socket are closed by being welded or brazed, as shown at 7. This provides a strong fool proof enclosure preventing tampering with the locking tongues and permitting of access thereto only by inserting the end 8 of the strap 1 therein.

Suitable marks or characters of identification may be placed on the band or socket either before or after application of the seal, for example as shown at 9.

To apply the seal to an object to be identified or protected, for example to a tree or shrub, or a chair or other piece of furniture, the band 1 is arranged to encircle a part of such an object so as to cause the end 8 to be engaged in the socket 6. It is noted that the end 8 has lines of weakness, as at 10, transversely thereof whereby portions of said end may be broken off to provide of use of different pairs of the teeth 5, and to thereby fit the seal to objects of different sizes.

In the case of a tree, shrub, leg or arm of a chair or the like, it is preferable to have the seal fit tight thereon in such manner that it cannot be slipped off such object. Therefore, the length of the band is adjusted by breaking off the ends 8 thereof, as aforementioned, whereby the two outermost teeth are disposed to engage with the locking tongues 3 and 4.

It is now clear that upon insertion of the end 8 into the socket 6 said end will force the resilient tongues 3 and 4 apart and the teeth 5 may be quickly engaged with said ends whereby to automatically lock the seal in place when thus inserting the end 8. By having the teeth 5 and ends of the locking tongues spaced apart longitudinally of the band, it is seen that a strong and secure lock is provided and that it is impossible to insert a tool into the socket to force the spring tongues free of the teeth owing to the limited space for movement of said tongues when the end 8 is in place. Furthermore, the points of locking engagement of the tongues and teeth in being spaced apart within the socket 6 causes the strains on the interlocked parts to be widely and better distributed. In this way a stronger lock is provided and all possibility of release of the lock without detection is removed.

It will now be seen that the seal of the invention although applicable to railway car doors and all other places where seals are employed is particularly applicable to trees, plants, shrubs, furniture and other articles to present substitution of such articles which a purchaser has selected.

I claim:

1. In a seal, a bendable band adapted to be affixed to an object to be protected or identified thereby, opposed resilient locking tongues adjacent one end of said band and arranged to receive and engage the other end of the band therebetween, said tongues being of different lengths, and teeth provided on opposite sides of said other end of the band and adapted to lock against free ends of said tongues.

2. In a seal, a bendable band adapted to be affixed to an object to be protected or identified thereby, opposed resilient locking tongues adjacent one end of said band and arranged to receive and engage the other end of the band therebetween, said tongues being of different lengths, teeth provided on opposite sides of said other end of the band and adapted to lock against free ends of said tongues, and a housing for said tongues being open at one end only to receive said other end.

3. In a seal, a bendable band adapted to be affixed to an object to be protected or identified thereby, opposed resilient locking tongues adjacent one end of said band and arranged to receive and engage the other end of the band therebetween, said tongues being of different lengths, teeth provided on opposite sides of said other end of the band and adapted to lock against free ends of said tongues, and a housing for said tongues being open at one end only to receive said other end, said tongues extending inwardly from the open end and formed integral with the opposite sides of the housing at said end.

4. In a seal, a bendable band, a housing at one end of said band, resilient locking tongues of differing lengths formed integral with opposite sides and at the outer end of said housing and extending convergently therein, the other end of said band being arranged to be extended into said housing between and in engagement with said tongues, and teeth on opposite sides and at spaced points of said other end and arranged to lock against the free ends of said tongues.

PHILIP DONOHOE.